US009848333B2

(12) United States Patent
Zhang (10) Patent No.: US 9,848,333 B2
(45) Date of Patent: Dec. 19, 2017

(54) METHOD SUPPORTING WIRELESS ACCESS TO STORAGE DEVICE, AND MOBILE ROUTING HOTSPOT DEVICE (71) Applicant: Huawei Device Co., Ltd., Shenzhen (CN)

(72) Inventor: Wei Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 15/108,876

(22) PCT Filed: Dec. 30, 2014

(86) PCT No.: PCT/CN2014/095660
§ 371 (c)(1),
(2) Date: Jun. 29, 2016

(87) PCT Pub. No.: WO2015/101296
PCT Pub. Date: Jul. 9, 2015

(65) Prior Publication Data
US 2016/0330627 A1 Nov. 10, 2016

(30) Foreign Application Priority Data
Dec. 31, 2013 (CN) .......................... 2013 1 0752485

(51) Int. Cl.
*H04M 1/725* (2006.01)
*H04W 12/08* (2009.01)
(Continued)

(52) U.S. Cl.
CPC .......... *H04W 12/08* (2013.01); *G06F 3/0622* (2013.01); *G06F 3/0659* (2013.01);
(Continued)

(58) Field of Classification Search
CPC ... H04W 4/12; H04W 12/06; H04M 1/72522; H04L 29/08072; H03D 7/125
(Continued)

(56) References Cited

U.S. PATENT DOCUMENTS 7,406,294 B1 * 7/2008 Liu .......................... H04L 67/04
455/3.06
8,547,061 B1  10/2013 Wong
(Continued)

FOREIGN PATENT DOCUMENTS

CN  101873355 A  10/2010
CN  202218422 U   5/2012
(Continued)

*Primary Examiner* — Danh Le (57) ABSTRACT

A method supporting wireless access to a storage device, and a mobile routing hotspot device. The method is applied to a mobile routing hotspot device, where the mobile routing hotspot device is connected to a storage device by using a USB interface, and the method includes: receiving, by the mobile routing hotspot device, an access request that is sent by user equipment in a wireless communications manner and that is for accessing a specified file in the storage device, where the access request carries information about the specified file; acquiring, by the mobile routing hotspot device, the specified file in the storage device according to the information about the specified file by using the USB interface; and outputting, by the mobile routing hotspot device, the specified file to the user equipment according to the access request in a wireless communications manner.

12 Claims, 4 Drawing Sheets (51) Int. Cl.
*G06F 21/62* (2013.01)
*G06F 3/06* (2006.01)
*H04W 88/08* (2009.01)

(52) U.S. Cl.
CPC ............ *G06F 3/0679* (2013.01); *G06F 21/62* (2013.01); *H04W 88/08* (2013.01)

(58) Field of Classification Search
USPC ................ 455/411, 412.1, 556.1; 709/219
See application file for complete search history.

(56) References Cited

U.S. PATENT DOCUMENTS

| | | | | |
|---|---|---|---|---|
| 2006/0173846 | A1* | 8/2006 | Omae ................ | G06F 21/35 |
| 2008/0126294 | A1* | 5/2008 | Ray .................. | H04L 67/06 |
| 2008/0177755 | A1* | 7/2008 | Stern ................ | G06F 21/568 |
| 2009/0300020 | A1 | 12/2009 | Chen et al. | |
| 2010/0058359 | A1* | 3/2010 | Ferlitsch .......... | G06F 13/102 |
| | | | | 719/321 |
| 2010/0211874 | A1* | 8/2010 | Weiss ............... | G06F 3/0482 |
| | | | | 715/716 |
| 2010/0299517 | A1* | 11/2010 | Jukic ............... | H04L 63/0823 |
| | | | | 713/150 |
| 2011/0296197 | A1* | 12/2011 | Konetski ........... | G06F 21/53 |
| | | | | 713/189 |
| 2012/0047331 | A1* | 2/2012 | Meza ................ | G06F 12/126 |
| | | | | 711/134 |
| 2012/0117381 | A1* | 5/2012 | Lo .................... | G06F 8/63 |
| | | | | 713/156 |
| 2013/0007207 | A1* | 1/2013 | Dietrich ........... | G06F 17/30203 |
| | | | | 709/217 |
| 2013/0090060 | A1 | 4/2013 | Kim | |

FOREIGN PATENT DOCUMENTS

| | | |
|---|---|---|
| CN | 202261405 U | 5/2012 |
| CN | 102541957 A | 7/2012 |
| CN | 103428277 A | 12/2013 |
| CN | 203366744 U | 12/2013 |
| CN | 103731497 A | 4/2014 |
| JP | 5279760 B2 | 9/2013 |
| WO | 2013/152644 A1 | 10/2013 |

* cited by examiner

METHOD SUPPORTING WIRELESS ACCESS TO STORAGE DEVICE, AND MOBILE ROUTING HOTSPOT DEVICE

CROSS REFERENCE TO RELATED APPLICATIONS

The present application claims priority under 35 U.S.C. §365 to International Patent Application No. PCT/CN2014/095660 filed Dec. 30, 2014 which claims priority to Chinese Patent Application No. CN201310752485.5, filed with the Chinese Patent Office on Dec. 31, 2013 and entitled "METHOD SUPPORTING WIRELESS ACCESS TO STORAGE DEVICE, AND MOBILE ROUTING HOTSPOT DEVICE", which are incorporated herein by reference in its entirety.

TECHNICAL FIELD

The present invention relates to the field of communications technologies, and in particular, to a method supporting wireless access to a storage device, and a mobile routing hotspot device.

BACKGROUND

Intelligent mobile devices such as smartphones and tablet computers have increasingly become an indispensable part of people's life. However, restricted by the development of storage technologies, capacity of flash memories equipped for these devices is still very limited at present and will remain so for a relatively long time in the future, and generally are not greater than 64 GB. What is worse, some devices do not support expansion by an external storage.

Then, WiFi (wireless-fidelity) wireless removable hard disks come into being in good time. After a WiFi hotspot is created by using a wireless removable hard disk, all mobile devices can share storage space of the wireless removable hard disk by using WiFi, which extremely expands storage space of mobile devices. However, at present, a WiFi wireless removable hard disk is priced relatively high on the market, and in addition, in the past many years, ordinary users may all have already possessed storage devices such as ordinary removable hard disks or flash drives. Therefore, how to access storage devices such as ordinary removable hard disks or USB flash drives in a wireless communications manner becomes an issue to be urgently resolved.

SUMMARY

Embodiments of the present invention provide a method supporting wireless access to a storage device, and a mobile routing hotspot device, which can implement access to an ordinary storage device in a wireless communications manner.

To resolve the foregoing technical issue, the embodiments of the present invention disclose the following technical solutions:

According to a first aspect, a method supporting wireless access to a storage device is provided, which is applied to a mobile routing hotspot device, where the mobile routing hotspot device is connected to the storage device by using a universal serial bus USB interface, and the method includes:

receiving, by the mobile routing hotspot device, an access request that is sent by user equipment in a wireless communications manner and that is for accessing a specified file in the storage device, where the access request carries information about the specified file;

acquiring, by the mobile routing hotspot device, the specified file in the storage device according to the information about the specified file by using the USB interface; and outputting, by the mobile routing hotspot device, the specified file to the user equipment according to the access request in a wireless communications manner.

With reference to the first aspect, in a first possible implementation manner, before the receiving, by the mobile routing hotspot device, an access request that is sent by user equipment in a wireless communications manner and that is for accessing a specified file in the storage device, the method further includes:

recognizing, by the mobile routing hotspot device, the storage device by using a signal received by the USB interface;

obtaining, by the mobile routing hotspot device, file description information and storage addresses of files stored in the storage device, where the file description information of the stored files is in a one-to-one correspondence with the storage addresses of the stored files; and displaying, by the mobile routing hotspot device, the file description information of the stored files to a user by using a web user interface when the user equipment accesses the mobile routing hotspot device, so that the user equipment sends, according to the description information of the stored files, the access request for accessing the specified file in the storage device.

With reference to the first aspect and/or the first possible implementation manner, in a second possible implementation manner, after the obtaining, by the mobile routing hotspot device, file description information of files stored in the storage device, the method further includes:

categorizing the file description information of the stored files according to file types included in the file description information of the stored files, and creating a file information table according to categories; and the displaying, by the mobile routing hotspot device, the file description information of the stored files to a user by using a web user interface includes:

displaying, by the mobile routing hotspot device, the file information table to the user by using the web user interface.

With reference to the first aspect, and/or the first possible implementation manner, and/or the second possible implementation manner, in a third possible implementation manner, when the information about the specified file includes a storage address of the specified file, the acquiring, by the mobile routing hotspot device, the specified file in the storage device according to the information about the specified file by using the USB interface includes:

acquiring, by the mobile routing hotspot device, the specified file in the storage device according to the storage address of the specified file by using the USB interface.

With reference to the first aspect, and/or the first possible implementation manner, and/or the second possible implementation manner, and/or the third possible implementation manner, in a fourth possible implementation manner, when the information about the specified file includes file identification information of the specified file, where the file description information includes the file identification information, the acquiring, by the mobile routing hotspot device, the specified file in the storage device according to the information about the specified file by using the USB interface includes:

searching, by the mobile routing hotspot device according to the one-to-one correspondence between the file description information of the stored files and the storage addresses of the stored files, for a storage address of the specified file that corresponds to the file description information of the specified file; and acquiring, by the mobile routing hotspot device, the specified file in the storage device according to the storage address of the specified file by using the USB interface.

According to a second aspect, a mobile routing hotspot device chip is provided, where the mobile routing hotspot device chip includes a receipt control unit, a first information acquiring unit, and a first information output unit, where the receipt control unit is configured to control a wireless receiver to receive an access request that is sent by user equipment and that is for accessing a specified file in a storage device, where the access request carries information about the specified file;

the first information acquiring unit is configured to acquire the specified file in the storage device according to the information about the specified file by using a USB interface that connects the mobile route device chip to the storage device; and the first information output unit is configured to control, according to the access request, a wireless transmitter to output the specified file to the user equipment.

With reference to the second aspect, in a first possible implementation manner, the mobile routing hotspot device chip further includes:

a recognition unit, configured to: before the receipt control unit controls the wireless receiver to receive the access request, recognize the storage device according to a signal received by the USB interface;

a second information acquiring unit, configured to acquire file description information and storage addresses of files stored in the storage device, where the file description information of the stored files is in a one-to-one correspondence with the storage addresses of the stored files; and a second information output unit, configured to output the file description information of the stored files by using a web user interface when the user equipment accesses the mobile routing hotspot device, so that the user equipment sends, according to the description information of the stored files, the access request for accessing the specified file in the storage device.

With reference to the second aspect and/or the first possible implementation manner, in a second possible implementation manner, the mobile routing hotspot device chip further includes:

a categorizing unit, configured to: after the second information acquiring unit obtains the file description information and the storage addresses of the files stored in the storage device, categorize the file description information of the stored files according to file types included in the file description information of the stored files, and create a file information table according to categories; and the second information output unit is specifically configured to output the file information table by using the web user interface.

With reference to the second aspect, and/or the first possible implementation manner, and/or the second possible implementation manner, in a third possible implementation manner, the first information acquiring unit is specifically configured to: when the information about the specified file includes a storage address of the specified file, acquire the specified file in the storage device according to the storage address of the specified file by using the USB interface.

With reference to the second aspect, and/or the first possible implementation manner, and/or the second possible implementation manner, and/or the third possible implementation manner, in a fourth possible implementation manner, if the information about the specified file includes file identification information of the specified file, where the file description information includes the file identification information, the first information acquiring unit includes:

a searching subunit, configured to search, according to the one-to-one correspondence between the file description information of the stored files and the storage addresses of the stored files, for a storage address of the specified file that corresponds to the file description information of the specified file; and an acquiring subunit, configured to acquire the specified file in the storage device according to the storage address of the specified file by using the USB interface.

According to a third aspect, a mobile routing hotspot device is provided, including an application processor chip, and a wireless transceiver and a USB interface separately connected to the application processor chip, where the USB interface is configured to connect to an external storage device; and the application processor chip is configured to receive, by using the wireless transceiver, an access request that is sent by user equipment and that is for accessing a specified file in the storage device, where the access request carries information about the specified file; acquire the specified file in the storage device according to the information about the specified file by using the USB interface; and output the specified file to the user equipment according to the access request by using the wireless transceiver.

With reference to the third aspect, in a first possible implementation manner, the application processor chip is further configured to: before receiving the access request that is sent by the user equipment in a wireless communications manner and that is for accessing the specified file in the storage device, recognize the storage device according to a signal received by the USB interface; obtain file description information and storage addresses of files stored in the storage device, where the file description information of the stored files is in a one-to-one correspondence with the storage addresses of the stored files; and output the file description information of the stored files to the user equipment by using a web user interface when the user equipment accesses the mobile routing hotspot device, so that the user equipment sends, according to the description information of the stored files, the access request for accessing the specified file in the storage device.

With reference to the third aspect and/or the first possible implementation manner, in a second possible implementation manner, the application processor chip is further configured to: after obtaining the file description information of the files stored in the storage device, categorize the file description information of the stored files according to file types included in the file description information of the stored files, and create a file information table according to categories; and output the file information table to the user equipment by using the web user interface.

With reference to the third aspect, and/or the first possible implementation manner, and/or the second possible implementation manner, in a third possible implementation manner, the application processor chip is specifically configured to: when the information about the specified file includes a storage address of the specified file, acquire the specified file in the storage device according to the storage address of the specified file by using the USB interface.

With reference to the third aspect, and/or the first possible implementation manner, and/or the second possible implementation manner, and/or the third possible implementation manner, in a fourth possible implementation manner, the application processor chip is specifically configured to: when the information about the specified file includes file identification information of the specified file, where the file description information includes the file identification information, search, according to the one-to-one correspondence between the file description information of the stored files and the storage addresses of the stored files, for a storage address of the specified file that corresponds to the file description information of the specified file; and acquire the specified file in the storage device according to the storage address of the specified file by using the USB interface.

In the embodiments of the present invention, a mobile routing hotspot device reads and processes files stored in a storage device, which enables a user to implement wireless access to the storage device by accessing the mobile routing hotspot device. The present invention combines a mobile routing hotspot device with a storage device to transform an ordinary storage device into a WiFi hard disk device. In this way, a user can directly access, by using WiFi, a file in an existing storage device conveniently without buying a dedicated device. Moreover, because the mobile routing hotspot device is generally developed by a professional wireless terminal device vendor, WiFi performance is better and more than 10 mobile terminals can be supported. In addition, capacity of a battery equipped for the mobile routing hotspot device is very large. Therefore, applications in a mobile scenario can be better supported.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figure 1:
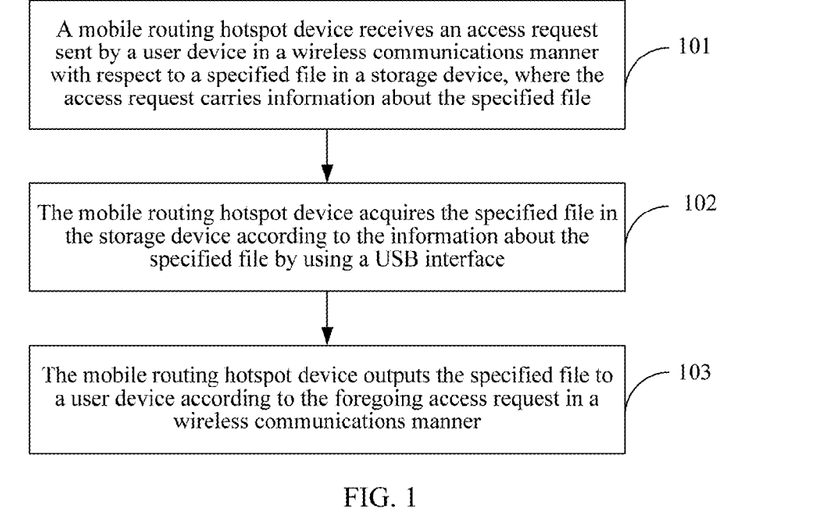
FIG. 1 is a flowchart of a method supporting wireless access to a storage device according to an embodiment of the present invention.

Referring to FIG. 1, FIG. 1 is a flowchart of a method supporting wireless access to a storage device according to an embodiment of the present invention.

Figure 2:
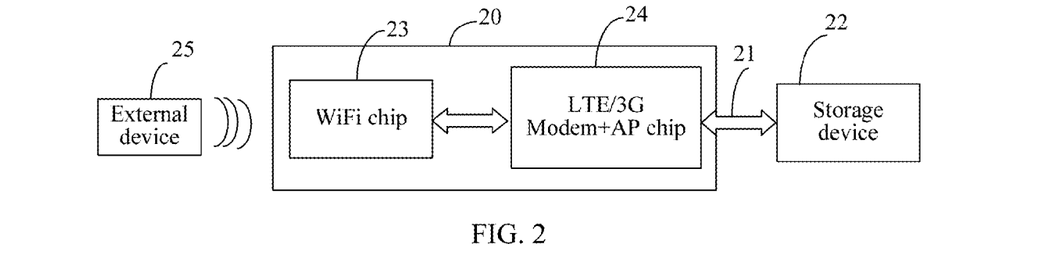
FIG. 2 is a schematic diagram of supporting wireless access to a storage device according to an embodiment of the present invention.

In this embodiment of the present invention, a structure of a mobile routing hotspot device may be shown in FIG. 2, where the mobile routing hotspot device 20 has an external interface 21, which may be a USB (Universal Serial Bus, universal serial bus) interface, or may be a Micro USB interface. A storage device 22 such as a removable hard disk or a flash drive may be connected to the mobile routing hotspot device 20 by using the interface 21. If the interface 21 is a Micro USB interface, the storage device 22 may be connected to the mobile routing hotspot device 20 by using a Micro USB/USB line. The mobile routing hotspot device further includes a wireless transceiver and an application processor chip that is connected to the wireless transceiver, where the wireless transceiver may be a WiFi (Wireless-Fidelity) chip 23 shown in the figure, and the application processor chip may be an LTE/3G modem+AP chip 24 shown in the figure. The WiFi chip 23 is configured to implement wireless communications between the mobile routing hotspot device 20 and an external device (user equipment) 25. The application processor chip is configured to implement wireless access to the storage device 22 by the external device 25, where the external device 25 may be a PC, a mobile phone, or the like.

After the storage device 22 such as a removable hard disk or a USB flash drive is connected to the mobile routing hotspot device 20, the external device 25, for example, a WiFi Client (wireless client) such as a PC or a mobile phone, may access the storage device 22 by using WiFi. A method by using which the mobile routing hotspot device 20 supports wireless access to the storage device may include:

Step 101: A mobile routing hotspot device receives an access request that is sent by user equipment in a wireless communications manner and that is for accessing a specified file in a storage device, where the access request carries information about the specified file.

The user equipment sends, in a wireless communications manner such as WIFI, an access request for accessing a specified file in the storage device, where the access request may include information about the specified file, for example, file identification information such as a name of the specified file, or a storage address of the specified file. After receiving the access request, the mobile routing hotspot device executes step 102.

Step 102: The mobile routing hotspot device acquires the specified file in the storage device according to the information about the specified file by using a USB interface.

The mobile routing hotspot device acquires the information about the specified file in the access request, reads the specified file in the storage device according to the information about the specified file by using an interface, and then executes a next step.

Step 103: The mobile routing hotspot device outputs the specified file to the user equipment according to the foregoing access request in a wireless communications manner.

In this embodiment of the present invention, a mobile routing hotspot device reads and processes files stored in a storage device, which enables a user to implement wireless access to the storage device by accessing the mobile routing hotspot device. The present invention combines a mobile routing hotspot device with a storage device to transform an ordinary storage device into a WiFi hard disk device. In this way, a user can directly access, by using WiFi, a file in an existing storage device conveniently without buying a dedicated device. Moreover, because the mobile routing hotspot device is generally developed by a professional wireless terminal device vendor, WiFi performance is better and more than 10 mobile terminals can be supported. In addition, capacity of a battery equipped for the mobile routing hotspot device is very large. Therefore, applications in a mobile scenario can be better supported.

Figure 3:
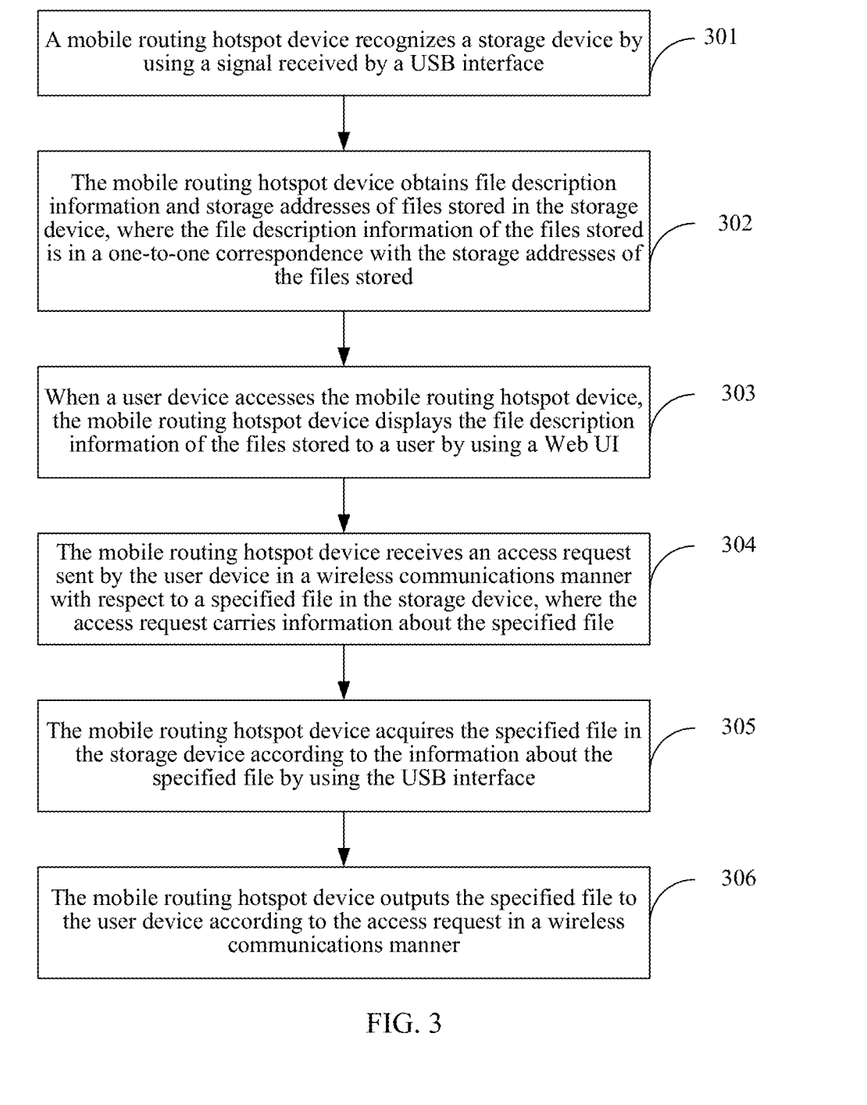
FIG. 3 is a flowchart of another method supporting wireless access to a storage device according to an embodiment of the present invention.

Referring to FIG. 3, FIG. 3 is a flowchart of another method supporting wireless access to a storage device according to an embodiment of the present invention.

A structure of a mobile routing hotspot device may be shown in FIG. 2, where the mobile routing hotspot device is connected to a storage device by using an interface. A method by using which the mobile routing hotspot device supports wireless access to the storage device by user equipment may include:

Step 301: A mobile routing hotspot device recognizes a storage device by using a signal received by a USB interface.

The mobile routing hotspot device first switches, according to a signal that is communicated between the mobile routing hotspot device and the storage device by using the interface, an interface mode of the mobile routing hotspot device to a universal serial bus host (USB Host) mode, and recognizes the storage device in the USB host mode. When the storage device is inserted into the mobile routing hotspot device, the mobile hotspot device determines, according to a storage device descriptor reported by the USB interface, whether the device is a storage device.

Step 302: The mobile routing hotspot device obtains file description information and storage addresses of files stored in the storage device, where the file description information of the stored files is in a one-to-one correspondence with the storage addresses of the stored files.

Manner 1: The mobile routing hotspot device may directly read the file description information and the storage addresses of the stored files in the storage device, and store the file description information and the storage addresses locally in the mobile routing hotspot device. Specifically, the file description information and the storage addresses may be stored in a local file server. The file description information of the stored files is in a one-to-one correspondence with the storage addresses of the stored files. File description information may include a file name, a file size, a file type, created time, modified time, a file format, and the like, and a storage address may be a url address or the like of a store filed.

Manner 2: After reading the file description information and the storage addresses of the stored files in the storage device, the mobile routing hotspot device categorizes the file description information of the stored files according to file types such as music and video included in the file description information of the stored files, and creates a file information table according to categories.

Step 303: When user equipment accesses the mobile routing hotspot device, the mobile routing hotspot device displays the file description information of the stored files to a user by using a Web UI.

The user equipment such as a mobile phone or an Ipad may access a file server of the mobile routing hotspot device in a wireless manner by using a browser, for example, by entering http://192.168.1.1. When the user equipment accesses the mobile routing hotspot device, the mobile routing hotspot device may display the file description information and the storage addresses of the stored files to the user by using a web user interface (Web UI). If the mobile routing hotspot device has categorized the file description information in the preceding step, the mobile routing hotspot device may display the foregoing file information table to the user by using the Web UI.

After viewing the file description information of the files stored in the storage device by using the Web UI, the user may select a specified file stored, for example, a video file in which the user is interested, according to the file description information, and then send an access request for accessing the specified file to the mobile routing hotspot device in a manner such as tapping, where the access request may include related information about the specified file, for example, identification information such as a file name, or a storage address of the specified file. The mobile routing hotspot device may further execute the following steps 304 to 306.

Step 304: The mobile routing hotspot device receives an access request that is sent by the user equipment in a wireless communications manner and that is for accessing a specified file in the storage device, where the access request carries information about the specified file.

The access request includes information about the specified file, where the information about the specified file may be a storage address of the specified file, or may be file identification information such as a file name of the specified file. The file identification information is at least one piece of the file description information of the stored files that is viewed by the user by using the Web UI.

Step 305: The mobile routing hotspot device acquires the specified file in the storage device according to the information about the specified file by using the USB interface.

When the information about the specified file includes a storage address of the specified file, the mobile routing hotspot device may directly acquire, by using the USB interface, the specified file in the storage device according to the storage address of the specified file that is included in the access request.

Figure 4:
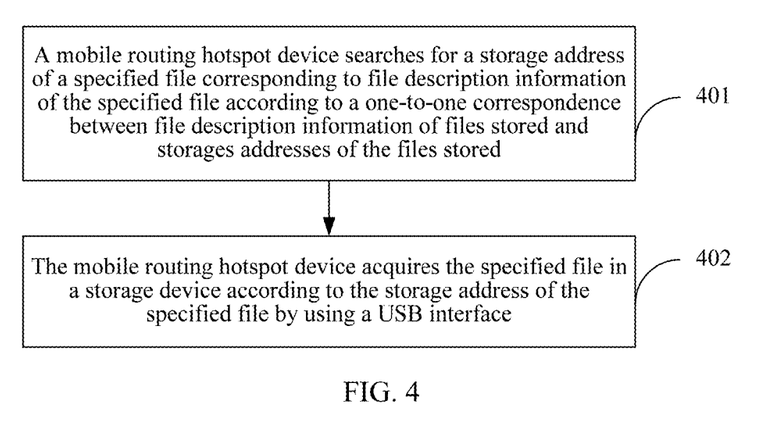
FIG. 4 is a flowchart of a method for acquiring a specified file in a storage device by a mobile routing hotspot device according to an embodiment of the present invention.

When the information about the specified file includes file identification information of the specified file, as shown in FIG. 4, the mobile routing hotspot device may further execute the following steps:

Step 401: The mobile routing hotspot device searches, according to the one-to-one correspondence between the file description information of the stored files and the storage addresses of the stored files, for a storage address of the specified file that corresponds to the file description information of the specified file.

Step 402: The mobile routing hotspot device acquires the specified file in the storage device according to the storage address of the specified file by using a USB interface.

Step 306: The mobile routing hotspot device outputs the specified file to the user equipment according to the access request in a wireless communications manner.

After obtaining data of the specified file, the mobile routing hotspot device may output the specified file to the user equipment in a wireless communications manner. Specifically, the specified file may be played, or the like.

The user may also download the specified file to the local user equipment. After receiving a download request, the mobile routing hotspot device transmits data of the specified file in the storage device to the user equipment, such as a mobile phone or an Ipad, on a user side.

In this embodiment of the present invention, a mobile routing hotspot device recognizes a storage device, and reads and processes file information in the storage device, which enables a user to implement wireless access to the storage device by accessing the mobile routing hotspot device. The present invention combines a mobile routing hotspot device with a storage device to transform an ordinary storage device into a WiFi hard disk device. In this way, a user can directly access, by using WiFi, a file in an existing storage device conveniently without buying a dedicated device. Moreover, because the mobile routing hotspot device is generally developed by a professional wireless terminal device vendor, WiFi performance is better and more than 10 mobile terminals can be supported. In addition, capacity of a battery equipped for the mobile routing hotspot device is very large. Therefore, applications in a mobile scenario can be better supported.

In a specific embodiment, a removable hard disk may be connected to a mobile routing hotspot device by using a USB interface, and the mobile routing hotspot device reads file description information of stored files and URL addresses of the stored files in the removable hard disk, where the file description information includes file names, file types, and file sizes. Then, the mobile routing hotspot device categorizes and stores the file description information of all the stored files according to the file types, and creates file table information, as shown in the following table:

| Video | Video A | 200 MB |
|---|---|---|
|  | Video B | 300 MB |
| Music | Audio C | 1.5 MB |
|  | Audio D | 2.5 MB |

A user logs in to a Web UI interface of the mobile routing hotspot device by entering an IP address, for example, http://192.168.1.1, into user equipment browser. The user may view the file information table by using the interface, and the user may also view a URL address of each stored file. The user determines, by using the file description information, a specified file that the user intends to access, for example, video A. The user sends an access request to the mobile routing hotspot device by tapping on video A, where the access request may directly include a url address of video A, or may include only a file name, video A. After the mobile routing hotspot device receives the access request, if the access request includes the url address of video A, the mobile routing hotspot device directly obtains video A in the removable hard disk according to the url address, and then outputs video A to the user equipment. If the access request includes the file name, video A, the mobile routing hotspot device searches for a url address corresponding to video A, obtains video A in the removable hard disk according to the url address, and then outputs video A to the user equipment. In this way, the user equipment can access the removable hard disk by using the mobile routing hotspot device.

The embodiments of the present invention may be applied to all wireless devices that have a USB interface and a WiFi capability, such as customer premise equipment (Customer Premise Equipment, CPE) and a home router.

The foregoing describes the method embodiments of the present invention, and the following describes an apparatus that implements the foregoing method.

Figure 5:
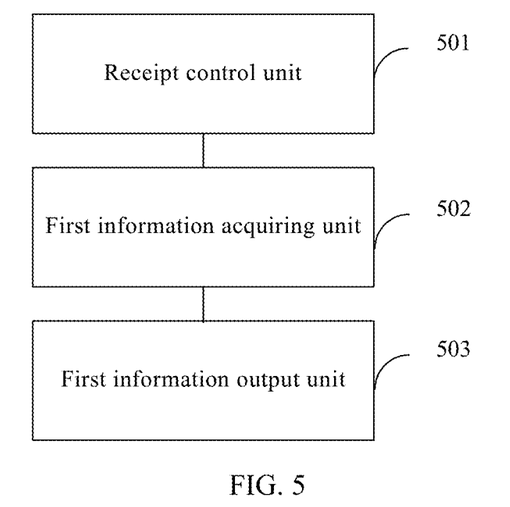
FIG. 5 is a schematic structural diagram of a mobile routing hotspot device chip according to an embodiment of the present invention.

Referring to FIG. 5, FIG. 5 is a schematic structural diagram of a mobile routing hotspot device chip according to an embodiment of the present invention.

The mobile routing hotspot device chip includes:

a receipt control unit 501, configured to control a wireless receiver to receive an access request that is sent by user equipment and that is for accessing a specified file in a storage device, where the access request carries information about the specified file;

a first information acquiring unit 502, configured to acquire, by using a USB interface that connects the mobile route device chip to the storage device, the specified file in the storage device according to the information about the specified file that is included in the access request; and a first information output unit 503, configured to control, according to the access request, a wireless transmitter to output the specified file to the user equipment.

By using the foregoing mobile routing hotspot device chip, this embodiment of the present invention implements wireless access to a storage device by a user. The present invention combines a mobile routing hotspot device with a storage device to transform an ordinary storage device into a WiFi hard disk device. In this way, a user can directly access, by using WiFi, a file in an existing storage device conveniently without buying a dedicated device. Moreover, because the mobile routing hotspot device is generally developed by a professional wireless terminal device vendor, WiFi performance is better and more than 10 mobile terminals can be supported. In addition, capacity of a battery equipped for the mobile routing hotspot device is very large. Therefore, applications in a mobile scenario can be better supported.

Figure 6:
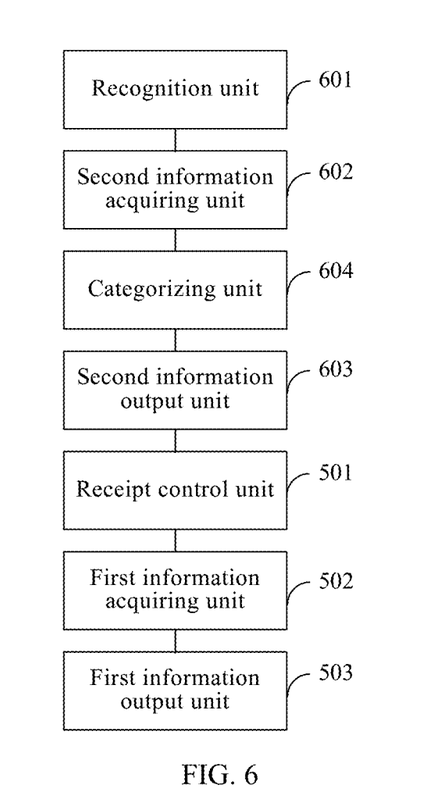
FIG. 6 is a schematic structural diagram of another mobile routing hotspot device chip according to an embodiment of the present invention.

In another embodiment of the present invention, as shown in FIG. 6, the mobile routing hotspot device chip may further include:

a recognition unit 601, configured to: before the receipt control unit 501 controls the wireless receiver to receive the access request, recognize the storage device according to a signal received by the USB interface that connects the mobile routing hotspot device chip to the storage device;

a second information acquiring unit 602, configured to acquire file description information and storage addresses of files stored in the storage device, where the file description information of the stored files is in a one-to-one correspondence with the storage addresses of the stored files; and a second information output unit 603, configured to output the file description information of the stored files by using a web user interface when the user equipment accesses the mobile routing hotspot device, so that the user equipment sends, according to the description information of the stored files, the access request for accessing the specified file in the storage device.

The mobile routing hotspot device chip may further include a categorizing unit 604, configured to: after the second information acquiring unit 602 obtains the file description information and the storage addresses of the files stored in the storage device, categorize the file description information of the stored files according to file types included in the file description information of the stored files, and create a file information table according to categories; and the second information output unit 603 is specifically configured to output the file information table by using a web user interface Web UI.

In another embodiment, the first information acquiring unit 502 is specifically configured to: when the information about the specified file includes a storage address of the specified file, acquire the specified file in the storage device according to the storage address of the specified file by using the USB interface; and if the information about the specified file includes file identification information of the specified file, where the file description information includes the file identification information, the first information acquiring unit 502 may include:

a searching subunit, configured to search, according to the one-to-one correspondence between the file description information of the stored files and the storage addresses of the stored files, for a storage address of the specified file that corresponds to the file description information of the specified file; and an acquiring subunit, configured to acquire the specified file in the storage device according to the storage address of the specified file by using the USB interface.

In each of the foregoing embodiments, the recognition unit 601 may be specifically configured to switch, according to a signal that is communicated between the mobile routing hotspot device and the storage device are connected by using the interface, an interface mode into a universal serial bus host USB Host mode, and recognize the storage device in the USB host mode.

Figure 7:
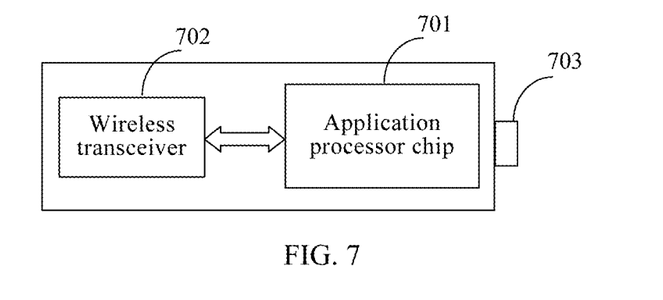
FIG. 7 is a schematic structural diagram of another mobile routing hotspot device according to an embodiment of the present invention.

In another embodiment of the present invention, as shown in FIG. 7, a mobile routing hotspot device is further provided, including an application processor chip 701, and a wireless transceiver 702 and a USB interface 703 separately connected to the application processor chip 701, where the USB interface 703 is configured to connect to an external storage device.

The application processor chip 701 is configured to receive, by using the wireless transceiver 702, an access request that is sent by user equipment and that is for accessing a specified file in the storage device, where the access request carries information about the specified file; acquire the specified file in the storage device according to the information about the specified file by using the USB interface 703; and output the specified file to the user equipment according to the access request by using the wireless transceiver.

Specifically, the wireless transceiver 702 may be a WiFi chip. The USB interface 703 may also be a Micro USB interface. A storage device such as a removable hard disk or a flash drive may be connected to the mobile routing hotspot device by using the USB interface 703. Because a supply current of a storage device is between 500 mA and 1000 mA, a maximum supply current of the USB interface 703 of the mobile routing hotspot device may reach about 1000 mA. In addition, when connecting to the storage device, the USB interface 703 is in a USB Host mode, and therefore the USB interface 703 needs to support an OTG (On-The-Go) mode.

In another embodiment, the application processor chip 701 may further be configured to: before receiving the access request that is sent by the user equipment in a wireless communications manner and that is for accessing the specified file in the storage device, recognize the storage device according to a signal received by the USB interface 703; obtain file description information and storage addresses of files stored in the storage device, where the file description information of the stored files is in a one-to-one correspondence with the storage addresses of the stored files; and output the file description information of the stored files to the user equipment by using a web user interface Web UI when the user equipment accesses the mobile routing hotspot device, so that the user equipment sends, according to the description information of the stored files, the access request for accessing the specified file in the storage device.

The application processor chip 701 may further be configured to: after obtaining the file description information of the files stored in the storage device, categorize the file description information of the stored files according to file types included in the file description information of the stored files, and create a file information table according to categories; and output the file information table to the user equipment by using the web user interface.

In another embodiment, the application processor chip 701 may be specifically configured to: when the information about the specified file includes a storage address of the specified file, acquire the specified file in the storage device according to the storage address of the specified file by using the USB interface; and when the information about the specified file includes file identification information of the specified file, where the file description information includes the file identification information, search, according to the one-to-one correspondence between the file description information of the stored files and the storage addresses of the stored files, for a storage address of the specified file that corresponds to the file description information of the specified file, and acquire the specified file in the storage device according to the storage address of the specified file by using the USB interface.

A person of ordinary skill in the art may be aware that the exemplary units and algorithm steps described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions to instruct a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method supporting wireless access to a storage device for use with a mobile routing hotspot device connected to the storage device by using a universal serial bus (USB) interface, the method comprising:
   receiving, by the mobile routing hotspot device, an access request sent by user equipment in a wireless communications manner and for accessing a specified file in the storage device, wherein the access request carries information about the specified file;
   acquiring, by the mobile routing hotspot device, the specified file in the storage device according to the information about the specified file by using the USB interface;
   outputting, by the mobile routing hotspot device, the specified file to the user equipment according to the access request in a wireless communications manner;
   wherein before receiving, by the mobile routing hotspot device, the access request sent by the user equipment in the wireless communications manner and for accessing the specified file in the storage device, the method further comprises:
      recognizing, by the mobile routing hotspot device, the storage device by using a signal received by the USB interface;
      obtaining, by the mobile routing hotspot device, file description information and storage addresses of files stored in the storage device, wherein the file description information of the stored files is in a one-to-one correspondence with the storage addresses of the stored files; and
      displaying, by the mobile routing hotspot device, the file description information of the stored files to a user by using a web user interface when the user equipment accesses the mobile routing hotspot device, so that the user equipment sends, according to the description information of the stored files, the access request for accessing the specified file in the storage device.

2. The method according to claim 1, wherein:
   after obtaining, by the mobile routing hotspot device, the file description information of files stored in the storage device, the method further comprises:
      categorizing, by the mobile routing hotspot device, the file description information of the stored files according to file types comprised in the file description information of the stored files, and creating a file information table according to categories; and
   displaying, by the mobile routing hotspot device, the file description information of the stored files to a user by using a web user interface comprises:
      displaying, by the mobile routing hotspot device, the file information table to the user by using the web user interface.

3. The method according to claim 1, wherein when the information about the specified file comprises a storage address of the specified file, acquiring, by the mobile routing hotspot device, the specified file in the storage device according to the information about the specified file by using the USB interface comprises:
   acquiring, by the mobile routing hotspot device, the specified file in the storage device according to the storage address of the specified file by using the USB interface.

4. The method according to claim 1, wherein when the information about the specified file comprises file identification information of the specified file and the file description information comprises the file identification information, acquiring, by the mobile routing hotspot device, the specified file in the storage device according to the information about the specified file by using the USB interface comprises:
   searching, by the mobile routing hotspot device according to the one-to-one correspondence between the file description information of the stored files and the storage addresses of the stored files, for a storage address of the specified file that corresponds to the file description information of the specified file; and
   acquiring, by the mobile routing hotspot device, the specified file in the storage device according to the storage address of the specified file by using the USB interface.

5. A mobile routing hotspot device chip, comprising:
   a receipt control unit configured to control a wireless receiver to receive an access request sent by user equipment and for accessing a specified file in a storage device, wherein the access request carries information about the specified file;
   a first information acquiring unit configured to acquire the specified file in the storage device according to the information about the specified file by using a universal serial bus (USB) interface that connects the mobile routing device chip to the storage device;
   a first information output unit configured to control, according to the access request, a wireless transmitter to output the specified file to the user equipment;
   a recognition unit, configured to:
      before the receipt control unit controls the wireless receiver to receive the access request, recognize the storage device according to a signal received by the USB interface;
   a second information acquiring unit, configured to obtain file description information and storage addresses of files stored in the storage device, wherein the file description information of the stored files is in a one-to-one correspondence with the storage addresses of the stored files; and
   a second information output unit, configured to output the file description information of the stored files by using a web user interface when the user equipment accesses the mobile routing hotspot device, so that the user equipment sends, according to the description information of the stored files, the access request for accessing the specified file in the storage device.

6. The mobile routing hotspot device chip according to claim 5, wherein:
the mobile routing hotspot device chip further comprises:
a categorizing unit, configured to:
after the second information acquiring unit obtains the file description information and the storage addresses of the files stored in the storage device, categorize the file description information of the stored files according to file types comprised in the file description information of the stored files, and create a file information table according to categories; and
the second information output unit is configured to output the file information table by using the web user interface.

7. The mobile routing hotspot device chip according to claim 5, wherein the first information acquiring unit is configured to:
when the information about the specified file comprises a storage address of the specified file, acquire the specified file in the storage device according to the storage address of the specified file by using the USB interface.

8. The mobile routing hotspot device chip according to claim 5, wherein when the information about the specified file comprises file identification information of the specified file and the file description information comprises the file identification information, the first information acquiring unit comprises:
a searching subunit, configured to search, according to the one-to-one correspondence between the file description information of the stored files and the storage addresses of the stored files, for a storage address of the specified file that corresponds to the file description information of the specified file; and
an acquiring subunit, configured to acquire the specified file in the storage device according to the storage address of the specified file by using the USB interface.

9. A mobile routing hotspot device, comprising:
an application processor chip, a wireless transceiver and a universal serial bus (USB) interface separately connected to the application processor chip, wherein the USB interface is configured to connect to an external storage device; and
wherein the application processor chip is configured to:
receive, by using the wireless transceiver, an access request sent by user equipment and for accessing a specified file in the storage device, wherein the access request carries information about the specified file;
acquire the specified file in the storage device according to the information about the specified file by using the USB interface;
output the specified file to the user equipment according to the access request by using the wireless transceiver;
before receiving the access request sent by the user equipment in the wireless communications manner and for accessing the specified file in the storage device, recognize the storage device according to a signal received by the USB interface;
obtain file description information and storage addresses of files stored in the storage device, wherein the file description information of the stored files is in a one-to-one correspondence with the storage addresses of the stored files; and
output the file description information of the stored files to the user equipment by using a web user interface when the user equipment accesses the mobile routing hotspot device, so that the user equipment sends, according to the description information of the stored files, the access request for accessing the specified file in the storage device.

10. The mobile routing hotspot device according to claim 9, wherein the application processor chip is further configured to:
after obtaining the file description information of the files stored in the storage device, categorize the file description information of the stored files according to file types comprised in the file description information of the stored files, and create a file information table according to categories; and
output the file information table to the user equipment by using the web user interface.

11. The mobile routing hotspot device according to claim 9, wherein the application processor chip is configured to:
when the information about the specified file comprises a storage address of the specified file, acquire the specified file in the storage device according to the storage address of the specified file by using the USB interface.

12. The mobile routing hotspot device according to claim 9, wherein the application processor chip is configured to:
when the information about the specified file comprises file identification information of the specified file and the file description information comprises the file identification information, search, according to the one-to-one correspondence between the file description information of the stored files and the storage addresses of the stored files, for a storage address of the specified file that corresponds to the file description information of the specified file; and
acquire the specified file in the storage device according to the storage address of the specified file by using the USB interface.

* * * * *